United States Patent [19]

Nagashio

[11] Patent Number: 5,712,473
[45] Date of Patent: Jan. 27, 1998

[54] PREPAID CARD

[76] Inventor: Kichinosuke Nagashio, 39-2, 3-chome Ebisu Shibuya-ku, Tokyo, Japan

[21] Appl. No.: 664,285

[22] Filed: Jun. 11, 1996

[30] Foreign Application Priority Data

Oct. 20, 1995 [JP] Japan ................................. 7-295890

[51] Int. Cl.$^6$ ................................................. G06K 19/06
[52] U.S. Cl. ................................. 235/494; 235/487
[58] Field of Search ................................. 235/487, 494

[56] References Cited

U.S. PATENT DOCUMENTS 4,776,464 10/1988 Miller ................................. 235/471

*Primary Examiner*—Harold Pitts
*Attorney, Agent, or Firm*—Morrison Law Firm

[57] ABSTRACT

A prepaid card is disclosed, which uses drawing codes not requiring so high accuracy and permits direct computer processing of read-out data without agency of any A/D converter, thus permitting system security improvement.

In the prepaid card 1, main information 2, personal information 3, fingerprint image 4 and security data rotation key 5 are printed on the surface as a transparent print pattern with box drawing codes provided in the form of four tetrahedrons of different sizes arranged one inside another, the four sides of each tetrahedron being constituted by respective segments representing respective bit expressions, the individual bit expressions of the segments being for a predetermined digit place arrangement from the least significant digit place to provide a binary number system expression representing a corresponding decimal or n-step number system expression, a predetermined numeral, character, symbol, etc. being represented by the bit expression of a segment or a summation of some of the bit expressions.

4 Claims, 4 Drawing Sheets (a)

(b)

1

PREPAID CARD

BACKGROUND OF THE INVENTION

1. Field of the Invention

This invention relates to a prepaid card using two-dimensional drawing codes, i.e., special box drawing codes.

As the technique of recognizing various kinds of information by using an optical reader (such as a scanner), bar code systems are most popular. Bar codes are used not only manufacturers for stock management, process management and management of data for assembling, shipment and so forth but also or POS systems (sale instant information managing systems) in stores and shops.

In these bar code systems, bar code symbols printed on an information code sheet are illuminated by light, and reflected light is read with an optical sensor. The read-out analog signal is converted in an A/D converter into digital signal, which is fed to a decoder for image processing in a microcomputer, thereby reading numerals, characters, etc. which are expressed by widths of bar code spaces.

In the above prior art bar code system, however, black and white bar codes that are printed on an information code sheet are required with very high accuracy in their width. The printing of bar code symbols, therefore, requires great time and expenditure.

In another aspect, for reading bar code symbols, the reflected light therefrom is read out as analog signal using an optical sensor, and the analog signal thus obtained is digitally converted using an A/D converter. This operation requires complicated equipment.

In a further aspect, for utilizing bar codes for prepaid cards or the like, which are issued from an issuing machine or the like after printing or magnetically recording money amount information corresponding to the money amount of an inserted bank note, resort is has to be a direct reading system, in which bar codes themselves are drawn two-dimensionally on a card, or a system, in which bar codes are read out as record information on a magnetic recording card. In this case, counterfeit such as copying of the card or re-writing of the information can be easily made. Therefore, the security of data lacks, thus giving rise to security problems in the system.

SUMMARY OF THE INVENTION

An object of the invention is to provide a prepaid card of a two-dimensional drawing code system, in which read-out data can be directly computer processed using simple configuration drawing codes not requiring high accuracy of written code signals and without use of any A/D conversion.

To attain the above object, according to the invention a prepaid card is constructed such that it has a transparent print pattern with box drawing codes each provided in the form of four tetrahedrons of different sizes arranged one inside another, the hour sides of each tetrahedron being constituted by respective segments representing respective bit expressions, each bit expression being "1" or "0" in dependence on whether its line is continuous or has a local cut or whether its line width is large or small, the individual bit expressions being for a predetermined digit place arrangement from the least significant digit place to provide a binary number system expression representing a corresponding n-step number system, a predetermined numeral, character, symbol, etc. being represented by the bit expression of a segment or a summation of some of the bit expressions.

A specific structure realizing the object of the invention is, as set forth in claim 1, a prepaid card having a transparent print with box drawing provided as basic codes in the form of four tetrahedrons of different sizes arranged one inside another, the four sides of each tetrahedron being constituted by respective segments representing respective bit expressions, the individual bit expressions of the segments being for a predetermined digit bit place arrangement from the least significant digit place to provide a binary number system expression representing a corresponding decimal or n-step number system expression, a predetermined numeral, character, symbol, etc. being represented by the bit expression of a segment or a summation of some of the bit expressions.

This structure permits obtaining a prepaid card, in which predetermined information is written as a transparent print pattern incapable of reading with visible light with box drawing codes each constituted by four tetrahedrons one arranged inside another.

Another specific structure realizing the object of the invention is, as set forth in claim 2, a prepaid card according to claim 1, wherein the box drawing codes as basic codes provide bit expressions in dependence on whether each segment as each side of each tetrahedron is continuous or has a cut.

This structure permits bit expression of "1" or "0" in dependence on whether each side line of each tetrahedron of the box drawing codes as the basic codes is continuous or has a cut.

A further specific structure realizing the object of the invention is, as set forth in claim 3, a prepaid card according to claim 1, wherein the box drawing codes as basic codes provide bit expressions in dependence on the line width each segment as each side of each tetrahedron.

This structure permits bit expression of "1" or "0" in dependence on whether each side line of each tetrahedron of the box drawing codes is large or small.

A still further structure realizing the object of the invention is, as set forth in claim 4, a prepaid card having a transparent print pattern with a block code constituted by a plurality of box drawing codes each provided as basic code in the form of four tetrahedrons of different sizes arranged one inside another, the four sides of each tetrahedron being constituted by respective segments representing respective bit expressions, the individual bit expressions of the segments being for a predetermined digit place arrangement from the least significant digit place to provide a binary number system expression representing a corresponding decimal or n-step number system expression, a predetermined numeral, character, symbol, etc. being represented by the bit expression of a segment or a summation of some of the bit expressions.

This structure permits block-by-block processing of 4-, 8- and 16-bit numeral, character, etc. data with block codes, in which bit expressions of the drawings of one block are summed up.

DETAILED DESCRIPTION OF THE PREFERRED EMBODIMENT

An embodiment of the invention will now be described with reference to the drawings.

Figure 1:
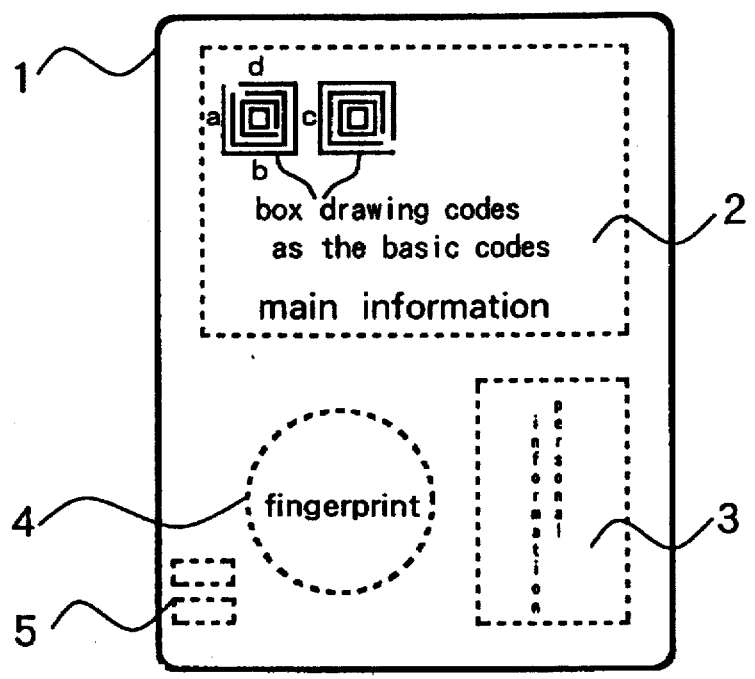
FIG. 1 is a plan view showing an embodiment of the prepaid card according to the invention.

FIG. 1 is a plan view showing an embodiment of the prepaid card according to the invention.

Referring to FIG. 1, a prepaid card 1 is shown, on the surface of which main information 2 such as money amount data in the form of box drawing codes and, if necessary, personal information 3 again in the form of box drawing codes, a user's registered fingerprint 4, and a security data rotation key 5, are written by using a transparent ink which is transparent when illuminated by visible light but becomes readable when illuminated by special wavelength light, such as ultraviolet rays.

Figure 2A:
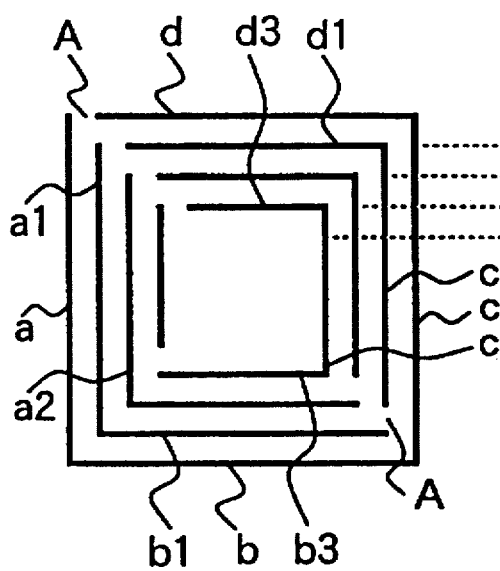
FIGS. 2(a) and 2(b) are views showing basic codes of corner cut type as the box drawing codes shown in FIG. 1.
Figure 2B:
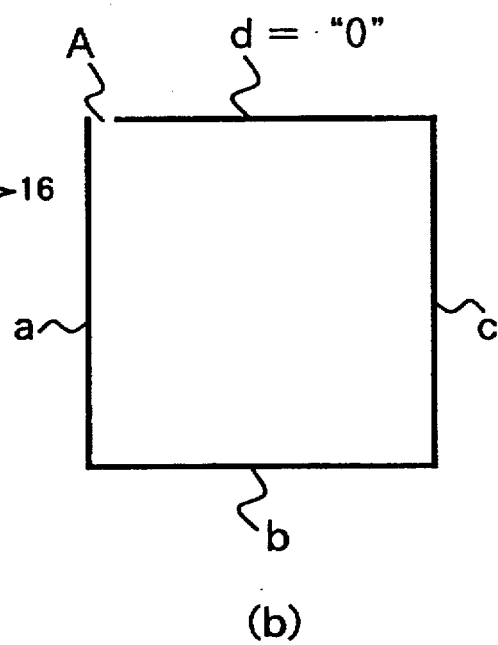

FIGS. 2(a) and 2(b) are views showing basic codes of corner cut type of the box drawing codes shown in FIG. 1. Referring to FIG. 2(a), the outermost box drawing is constituted by four side segments a to d, the second outermost one is constituted by four segments a1 to d1, the third outermost one is constituted by four side segments a2 to d2, and the innermost one is constituted by four side segments a3 to d3. When each side segment is made to constitute one bit, 4 bits can be displayed by one tetrahedron (i.e., one box drawing), and 16 bits by four tetrahedrons which are arranged one inside another to constitute a basic code structure. In other words, the four-tetrahedron arrangement permits $2^{16}=256 \times 256=65,536$ different expressions.

The outermost box drawing shown in FIG. 2(b) is now taken an example to describe bit expression with the individual side segments a to d. When it is prescribed that a segment line with a corner cut A corresponds to "0" and one without any corner cut corresponds to "1", with the FIG. 2(b) box drawing the line a corresponds to "1", the line b corresponds to "1", the line c corresponds to "1", and the line d corresponds to "0". This means that the FIG. 2(b) box drawing represents a binary code "1110".

Figure 3A:
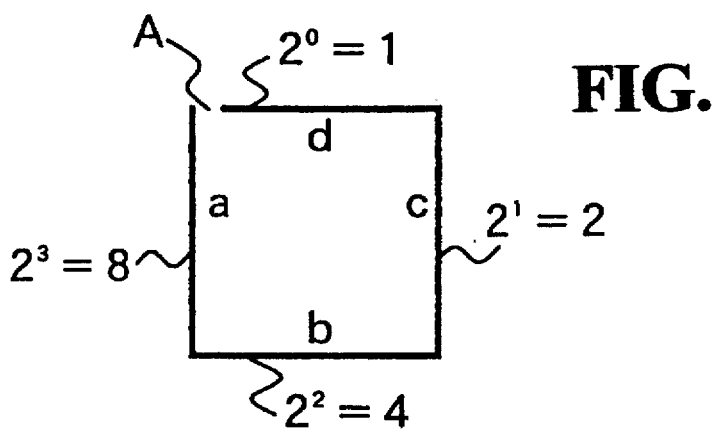
FIGS. 3(a) to 3(d) are views for describing binary codes provided by the box drawing codes shown in FIG. 1.
Figure 3B:
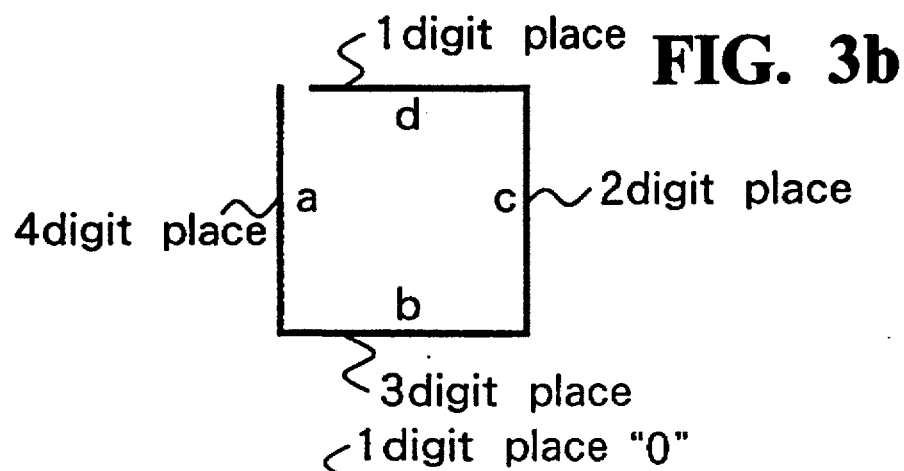
Figure 3C:
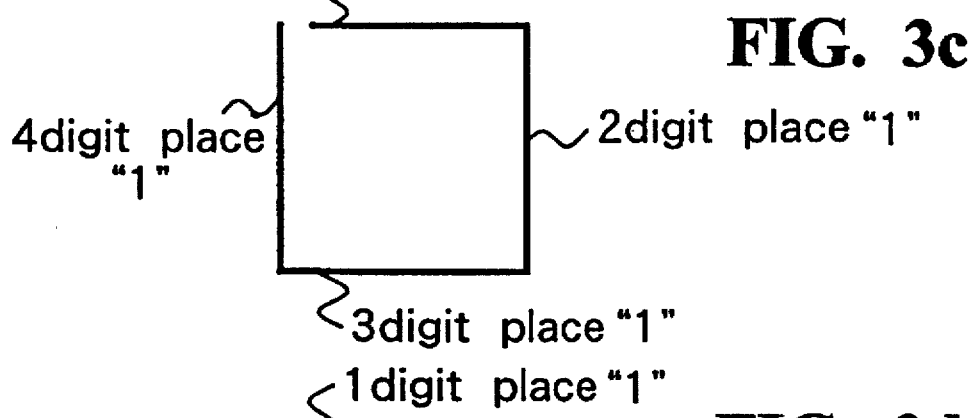

The conversion of a code into a corresponding binary number will now be described in detail with reference to FIGS. 3(a) to 3(d). Decimal numbers "14", "13" and "250", for instance, are expressed as "1110", "1101" and "11111010" in the binary number system. As shown in FIG. 3(a), the sides d to a are adapted to designate $2^0=1$, $2^1=2$, $2^2=4$ and $2^3=8$, respectively, and as shown in FIG. 3(b) the sides d to a are adapted to designate the first to fourth least significant digit places, respectively. The decimal number system expression $2^n$ thus can be represented by a corresponding binary code expression by setting "1" or "0" in each digit place.

As an example, the segment d (with corner cut A) which represents the first least significant digit place is "0", and the segments c to a respectively representing the second to fourth least significant digit places are "1'. The arrangement of the individual digit place data from the most significant digit place corresponds to a binary number expression "1110". With reference to FIG. 3(a), the binary numbers "0", "1", "1" and "1" of the segments d to a correspond to "0", "2", "4" and "8" in the decimal number system. Since 0+2+4+8=14, binary number "1110" corresponds to decimal number "14".

Figure 3D:
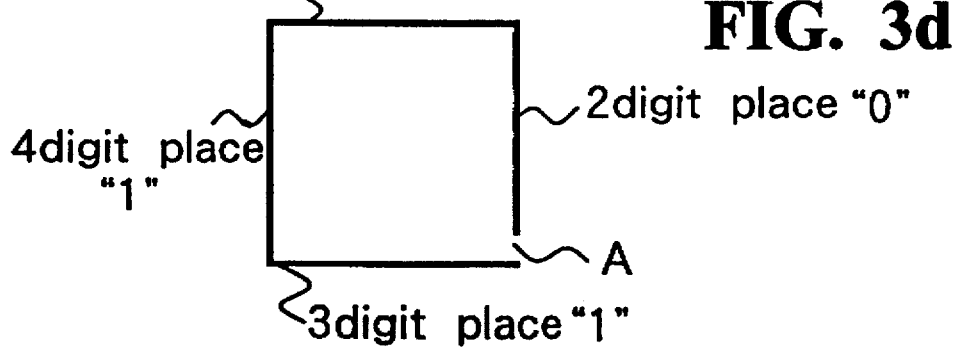

In case of FIG. 3(d), segment c (with corner cut) is "0", and binary number expression "1101" corresponds to 1+4+ 8=13 in the decimal number system. Since box drawing codes are capable of bit expression of binary numbers, a binary number expression can be readily converted to a corresponding hexadecimal one.

Figure 4:
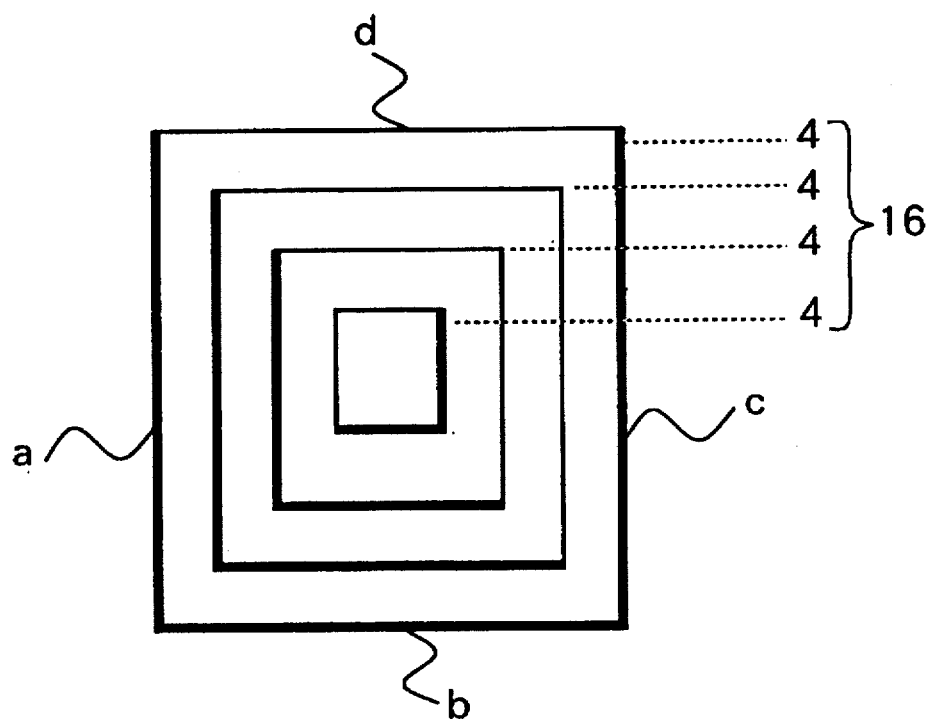
FIG. 4 is a view showing codes of segment line width type provided by the box drawing codes shown in FIG. 1.

FIG. 4 is a view showing basic codes of segment line width type as the box drawing codes shown in FIG. 1. Like the codes of corner cut type as shown in FIGS. 2(a) and 2(b), in the FIG. 4 segment line width type codes four box drawings each of four side segments a to d are arranged one inside another. The difference of this case is that the bit expression of each segment depends on whether the print width of the segment line is large or small, instead of whether or not the segment has a corner cut A. The large width of segment line is adapted to represent "1", and the small width is adapted to represent "0". The bit expression system of binary and hexadecimal numbers is the same as in the case of the corner cut type codes.

Figure 5:
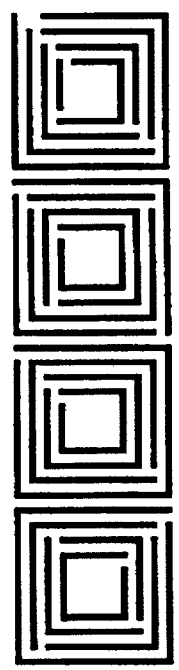
FIG. 5 is a view showing a block code provided by the box drawing codes shown in FIG. 1.

FIG. 5 shows a block code as the box drawing codes shown in FIG. 1. The FIG. 5 block code is a side-by-side arrangement of four basic codes noted before, each of which is the arrangement of four tetrahedrons one inside another. The basic codes may be arranged in either vertical or horizontal direction. The block code permits smooth handling of character information, such as alphabet letters each expressed in one byte (i.e., 8 bits) and kana characters each expressed in two bytes.

Operation will now be described.

Figure 6:
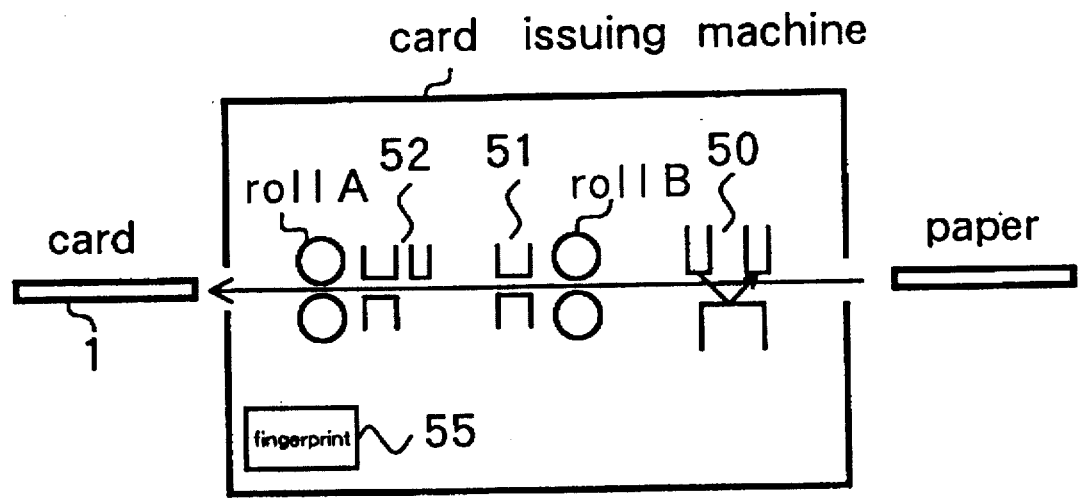
FIG. 6 is a schematic showing an issuing machine for issuing the prepaid card shown in FIG. 1.

FIG. 6 is a schematic showing a prepaid card issuing machine installed in a pachinco hall or like game spot. The FIG. 6 machine is an information writing means. For example, when a bank note is inserted into it, the machine writes money amount information or the like in the money amount information area 2 of the prepaid card 1 with a write head 51 or the like and issues the resultant prepaid card 1.

When writing data as box drawing codes described before, the first the security data rotation key 5 printed in transparent ink in the card 1 is read with a key code read sensor 50 by illuminating the rotation key 5 with special light. The content of the rotation key 5 may, for instance, be "2", and in this case the box drawing codes are rotated double the orthogonal angle in a specified direction (such as clockwise or counterclockwise) for the security purpose. As a result, the segment a is brought to the previous position of the segment c, and the segment b is brought to the previous position of the segment d. Through this code rotation, the information is coded to prevent counterfeiting or the like.

The box drawing code data obtained after the code rotation is written on the card with the write head 51, which is moved at a predetermined speed in a direction perpendicular to the direction of movement of the card (i.e., a horizontal direction). In this way, code data corresponding to the money amount information is written using transparent ink, thus completing the printing of the main information 2.

Then, auxiliary data such as personal data, if any, is written in the area 3. Also, a fingerprint extractor 55 extracts the user's fingerprint with a CCD. The extracted user's fingerprint is registered in a money, and its image is recorded in transparent ink in the area 4 of the prepaid card 1.

After the box drawing code data has been written, the written content is read out with an optical read head 52 for additional confirmation by illuminating the card 1 with special wavelength light for reading to check for any error. Then, the card 1 is subjected to a coating process and then issued to the user.

Figure 7:
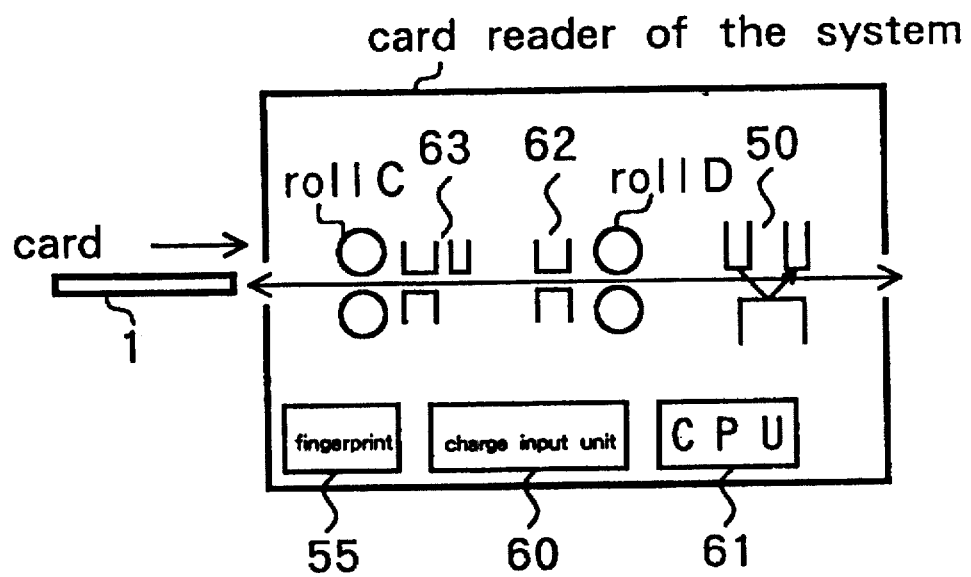
FIG. 7 is a schematic showing a reader for reading the prepaid card shown in FIG. 1.

FIG. 7 is a schematic showing a card reader of the system. When using the prepaid card 1, it is inserted into the card reader, and a desired money amount is inputted from a charge input unit 60. As a result, a CPU 61 causes a key code read sensor 50 to read the rotation key 5, causes a fingerprint extractor 55 to check the user's fingerprint, and causes an optical read sensor 63 box drawing codes in the residual money amount information area 2 of the card 1 by illuminating the codes with special wavelength light. The CPU 1 then causes decoding of the read-out drawing codes through rotation thereof in the reverse direction, i.e., counterclockwise direction, according to the rotation key data "2". The CPU 1 then reads the data directly, that is, without passing the data through any A/D converter. In this way, the CPU 1 effects residual money amount processing.

An optical read head 63 scans the box drawing codes, which are written in a horizontal row, by moving in a direction perpendicular to the direction of movement of the card 1 to read the codes with an optical sensor (or collectively read with an area sensor). In this way, box drawing data and combination data are read out.

The box drawing data and combination data out by the optical read head 63 are decoded in the converse procedure to that of the writing operation. Then, the CPU 61 confirms the residual money amount information and other information written on the card 1 and then causes a process of issuing pachinco balls or like game play items. The CPU 61 then causes a write head 62 to write new residual money amount information in the form of box drawing codes in transparent ink on the card 1. The resultant prepaid card 1 is then returned to the user.

As shown, in this embodiment simple box drawing codes are adopted and, at the same time, protection of data is made through printing of data in transparent ink, coding with security data rotation key, check of user's fingerprint, etc., thus greatly reinforcing the security.

As has been described in the foregoing, according to the invention a prepaid card is provided, on which such information as numerals, characters, symbols, etc. is printed in a transparent print pattern by using box drawing codes, which are provided by four tetrahedrons of different sizes arranged one inside another, the four sides of each tetrahedron being constituted by respective segments, each segment representing a bit expression of "1" or "0" in dependence on whether its line is continuous or has a local cut-off or whether its line width is large or small, the individual bit expressions being for a predetermined digit place arrangement from the least significant digit place to provide a binary number system expression corresponding to an n-step number system expression. With this prepaid card, it is thus possible to permit computer processing of data with simple box drawing codes which are not required to be highly accurate and without need of an A/D converter or the like, as well as preventing counterfeit of card and providing for security reinforcement.

What is claimed is:

1. A prepaid card having a transparent print pattern with box drawing codes provided as basic codes in the form of four tetrahedrons of different sizes arranged one inside another, the four sides of each tetrahedron being constituted by respective segments representing respective bit expressions, the individual bit expressions of the segments being for a predetermined digit place arrangement from the least significant digit place to provide a binary number system expression representing a corresponding decimal or hexadecimal number system expression, a predetermined numeral, character, symbol, being represented by the bit expression of each segment of a summation of some of the bit expressions.

2. The prepaid card according to claim 1, wherein the box drawing codes as the basic codes provide bit expressions in dependence on whether each segment is continuous or has a cut-off.

3. The prepaid card according to claim 1, wherein the box drawing codes as the basic codes provide bit expressions in dependence on the line width of each segment.

4. A prepaid card having a transparent print pattern with a block code constituted by a plurality of box drawing codes as basic codes arranged in a side-by-side arrangement and each in the form of four tetrahedrons of different sizes arranged one inside another, the four sides of each tetrahedron being constituted by respective segments representing respective bit expressions, the individual bit expressions of the segments being for a predetermined digit place arrangement from the least significant digit place to provide a binary number system expression representing a corresponding decimal of hexadecimal number system expression, a predetermined numeral, character, symbol, being represented by the bit expression of a segment or a summation of some of bit expressions.

* * * * *